Figure 5:
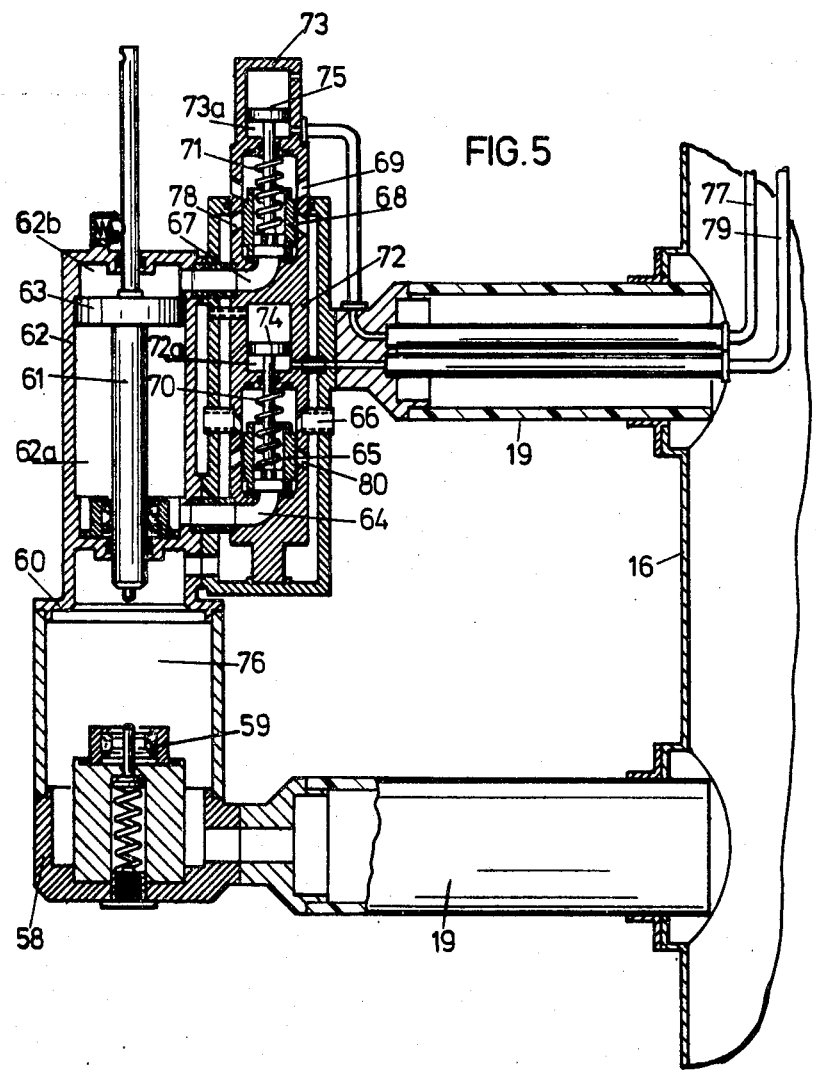

United States Patent [19]
Frowein

[11] 3,743,804
[45] July 3, 1973

[54] METAL CLAD ELECTRIC DISTRIBUTION AND SWITCHING PLANTS FOR HIGH VOLTAGES

[75] Inventor: Egbertus Adrianus Frowein, Arnhem, Netherlands

[73] Assignee: N.V. COQ, Utrecht, Netherlands

[22] Filed: Mar. 1, 1972

[21] Appl. No.: 230,615

[30] Foreign Application Priority Data
Mar. 5, 1971 Netherlands.................. 7102940

[52] U.S. Cl............. 200/148 B, 200/145, 317/103
[51] Int. Cl. .......................................... H01h 33/82
[58] Field of Search........................... 317/103, 112; 200/48 R, 48 V, 148 R, 148 B, 148 E, 148 H, 145

[56] References Cited
UNITED STATES PATENTS
| | | | |
|---|---|---|---|
| 2,981,815 | 4/1961 | Leeds et al...................... | 200/148 B |
| 3,350,528 | 10/1967 | McKeough...................... | 200/148 B |
| 3,364,327 | 1/1968 | Cromer......................... | 200/148 R X |
| 3,578,924 | 5/1971 | Boersma........................ | 317/103 X |

*Primary Examiner*—Richard B. Wilkinson
*Assistant Examiner*—U. Weldon
*Attorney*—John P. Snyder et al.

[57] ABSTRACT

A metal clad distribution and switching plant comprising panels for outgoing and incoming cables or lines, said panels being interconnected by busbars, each phase of said panels comprising a low-pressure-vessel filled with insulating gas and containing a high-pressure-vessel filled with arc extinguishing gas and outside said high-pressure-vessel all switches, connecting conductors, terminals and auxilary devices forming part of said phase, one of said switches being a gas blast circuit-breaker consisting of a series connection of pairs of cooperating contacts, each one of said pairs being accommodated in an individual switching vessel connected by a short conduit to said high-pressure-vessel.

15 Claims, 7 Drawing Figures

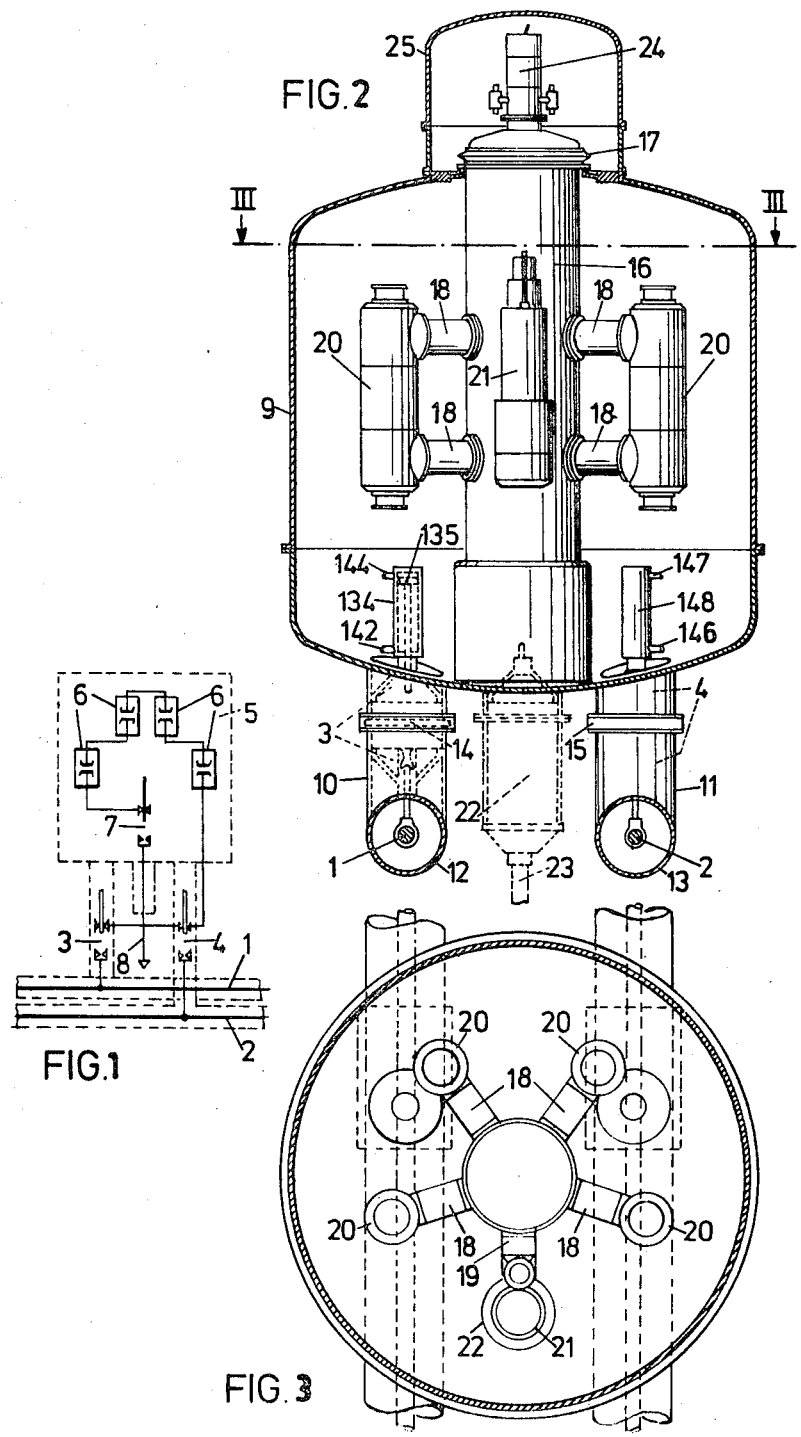

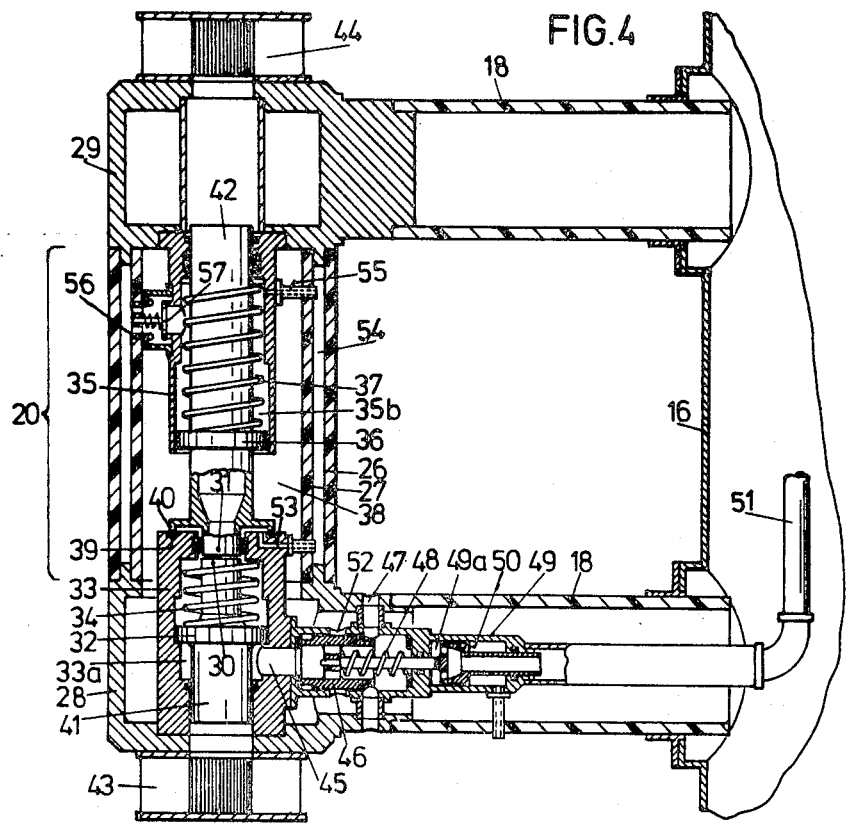
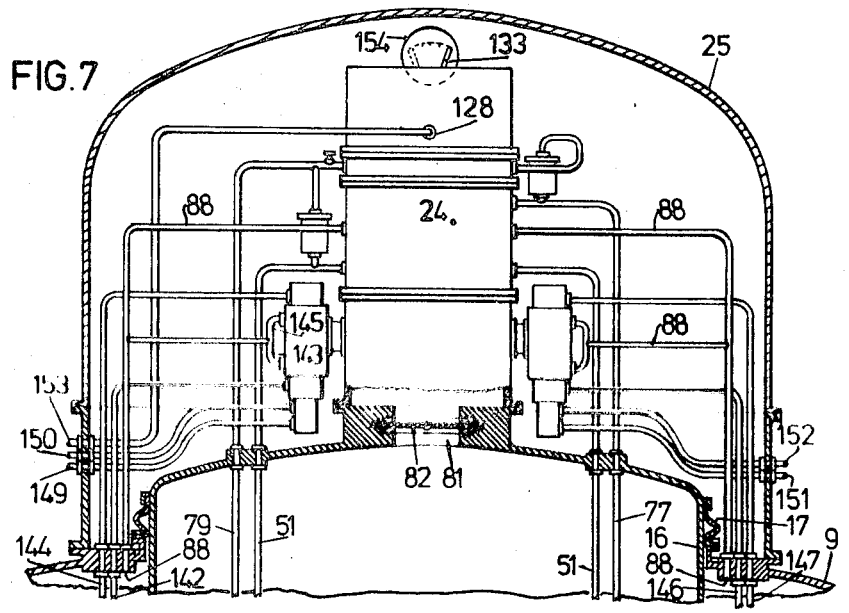

METAL CLAD ELECTRIC DISTRIBUTION AND SWITCHING PLANTS FOR HIGH VOLTAGES

The invention relates to a metal clad electric distribution and switching plant for high voltage comprising at least one busbar system and switching panels connected thereto and being each for each phase provided with a metal low-pressure-vessel which is filled with insulating gas, e. g. an electronegative gas such as sulphur hexafluoride under low pressure and in which a gas blast circuit-breaker comprising a series connection of a number of pairs of cooperating power contacts, which are at least constructed to interrupt the circuit, and all other switches, connecting conductors, terminal members and auxiliary devices forming part of a phase of the switching panel in question are insulatedly accommodated, said gas blast circuit-breaker being connected to a high-pressure-vessel which is filled with extinguishing gas, e.g. the same electronegative gas, under high pressure.

It has already been proposed to accommodate in distribution and switching plants for very high voltages all switches, connecting conductors, terminal members and auxiliary devices for measuring, signalling and protection, which form part of one and the same phase of a switching panel, in a common vessel filled with insulating gas, e.g. $SF_6$ gas.

In such plants it is difficult to carry out the control of and the gas supply to the pairs of cooperating power contacts of the gas blast circuit-breaker in such a manner, that said power contacts are all separated, extinguish the switching arcs and interrupt the circuit at the same moment. Another problem is the discharge of the extinguishing gas used for each pair of power contacts, since it must be avoided, that the extinguishing gas ionized by the switching arc of one pair of contacts affects the extinction of the switching arc set up between other cooperating power contacts. It has also appeared that in formerly constructed switching plants of this kind the devices and means for controlling the different switches are not easily accessible and much expensive gas is lost during disassembly for inspection, replacement and adjustment of said devices and means.

The invention has the object to provide a distribution and switching plant of the mentioned type, in which the described difficulties and disadvantages are either avoided or diminished. According to the invention this is achieved in that the high-pressure-vessel is located within the low-pressure-vessel and each pair of cooperating power contacts of the gas blast circuit-breaker is accommodated in an individual switching vessel which is connected to the high pressure vessel by a conduit of the shortest possible length and located outside said high-pressure-vessel. Besides the fact that due to this arrangement of the power contacts of the gas blast circuit-breaker the above mentioned difficulties and disadvantages are more or less avoided, this arrangement has the advantage that for each phase of a switching panel less space is required.

The circuit-breaker may consist of switching contacts which are adapted to interrupt the circuit as well as to keep the circuit interrupted and to close same. However, also a circuit-breaker may be used in such a switching panel, which comprises the series connection of a number of pairs of cooperating power contacts which are only constructed to interrupt the circuit and an isolator for keeping the circuit interrupted and for closing same. If circuit-breakers of the last mentioned type are used said isolator is, according to the invention, also accommodated in an individual switching vessel located outside the high-pressure-vessel. To decrease the size of a switching panel and to prevent mutual influencing of the zones of interruption of the switch by ionized extinguishing gas it is recommended to arrange all switching vessels of the gas blast circuit-breaker in a circular series round the high-pressure-vessel.

A simple construction is obtained when all switching vessels of the gas blast circuit-breaker are supported by the high-pressure-vessel.

If the distribution and switching plant is provided with a gas blast circuit-breaker, of which the movable switching contacts are coupled with pistons mounted for reciprocation in cylinders and driven by extinguishing gas from the high-pressure-vessel and in which spaces of these cylinders are connected to the high-pressure-vessel by conduits provided with valves operated from the outside and constructed to control said pistons, this plant can be advantageously constructed in such a manner that the high-pressure-vessel extends in a gas-tight manner through an end wall of the low-pressure-vessel and a housing containing means for the operation of said valves is attached to the high-pressure-vessel end wall lying outside the low-pressure-vessel. These operating means, which may also be the valves themselves, are then located both outside the low-pressure-vessel filled with insulating gas and outside the high-pressure-vessel filled with extinguishing gas, so that they are accessible without the necessity of opening for that purpose one of said vessels and of discharging the gas contained therein. In order to prevent the loss of gas by leakage, for instance along controlling rods extending through the wall of the housing containing the operating means, it is recommended to provide the housing containing the operating means in a space located above the pressure vessels and enclosed in a gas-tight manner by a removable envelope.

This construction, in which the operating means are placed outside the vessels, may be such, that the conduits provided with the valves for controlling the pistons coupled with the movable switching contacts of the gas blast circuit-breaker are connected to said housing and said valves are accommodated in said housing and constructed as change-over valves which in their one positions connect said conduits with a high-pressure-chamber contained in said housing and communicating with the high-pressure-vessel and in their other positions connect said conduits with the atmosphere or with the low-pressure-vessel. In this embodiment the conduits extending between said housing and the switching vessels of the gas blast circuit-breaker must transport both gas to drive the switching contacts and extinguishing gas to the circuit-breaker, so that very wide and, consequently, much space requiring conduits are necessary.

Such wide conduits extending between the housing containing the operating means and the parts of the circuit-breaker can be avoided, when the conduits provided with the valves for controlling the pistons coupled with the movable switching contacts of the gas blast circuit-breaker are directly connected to the high-pressure-vessel and said valves are provided on the switching vessels of the gas blast circuit-breaker and pneumatically operated, the conduits for the pneumatical operation of said valves then being connected to said housing and adapted to be connected through change-over valves accommodated in said housing either to the high-pressure-chamber contained in said housing and communicating with the high-pressure-vessel or to the atmosphere or the low-pressure-vessel. A similar construction is possible, in which the pneumatical operation of the valves provided on the switching vessels of the circuit-breaker are replaced by mechanical operating means for said valves. In that case said valves are for their operation mechanically coupled with operating means provided in the housing which is located outside the vessels filled with gas.

For the operation of the valves a construction is recommended, in which the operating means for the valves controlling the pistons coupled with the movable switching contacts of the gas blast circuit-breaker are coupled with differential pistons contained in said housing and mounted for reciprocation in differential cylinders, the smaller piston area of each one of said pistons being permanently exposed to the pressure in the high-pressure-chamber of said housing and the larger piston area thereof being exposed to the pressure in the cylinder space of greater diameter of the differential cylinder in question, said spaces of greater diameter of the differential cylinders communicating each through a conduit having a delaying action and through a change-over valve coupled with the differential piston in question either with said high-pressure-chamber or with the atmosphere or the low-pressure-vessel, and in which said operating means are held, in each condition of rest of the gas blast circuit-breaker, by locking means adapted to be unlocked from the outside in the position, in which said spaces of the differential cylinders communicate through said change-over valves with the atmosphere or the low-pressure-vessel. Consequently, in the condition of rest of the circuit-breaker the operating means are biassed so that in order to put the circuit-breaker in action only a locking member must be withdrawn.

The change-over valves coupled with the mentioned differential pistons may be at the same time the valves for controlling the pistons coupled with the movable switching contacts of the gas blast circuit-breaker. These change-over valves may, however, also be the change-over valves for the pneumatical operation of the valves for controlling the pistons coupled with the movable switching contacts of the gas blast circuit-breaker.

Preferably the locking means are held in the locking position by electrically controlled magnets. In that case the unlocking is effected electrically, so that it can be carried out directly by the protecting devices of the distribution and switching plant.

If the distribution and switching plant is provided with at least one isolator operated by a piston and cylinder and constructed to connect the gas blast circuit-breaker with other parts of the circuit, such as a busbar of a busbar system or a cable, it is advantageous to connect the spaces of said cylinder by conduits provided with change-over valves operated from the outside either with the high-pressure-chamber of the housing containing the operating means for controlling the gas blast circuit-breaker or with the atmosphere for the low-pressure-vessel, said change-over valves being accommodated in valve housings carried by said housing. In that case the operating and/or the controlling means of all switches forming part of one phase of a switching panel are located in and on the housing which is situated outside the gas filled vessels of said phase.

In order to make the disassembly of the housing containing the operating means for controlling the gas blast circuit-breaker easier and possible without the necessity of emptying the high-pressure-vessel, it is recommended to provide between the high-pressure-vessel and the high-pressure-chamber of said housing a valve adapted to be operated from the outside.

Figure 6:
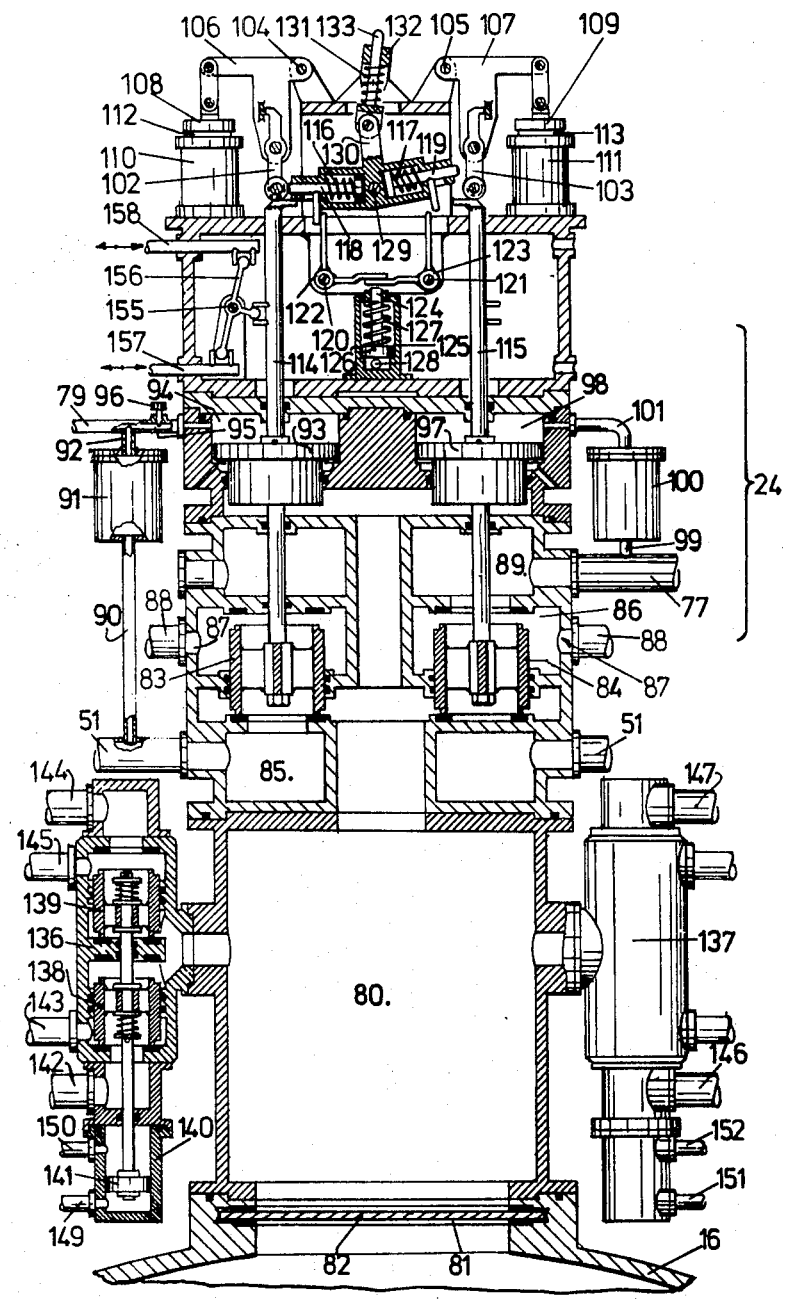

The invention will be further elucidated with the aid of the drawing, which shows by way of example details of a phase of a switching panel of a distribution and switching plant according to the invention. In the drawing are:

FIG. 1 a diagrammatical view of one phase of a switching panel for the connection of a cable to busbars of a double busbar system, FIG. 2 partly a vertical sectional view, partly an elevational view of the switching panel shown in FIG. 1, FIG. 3 a horizontal sectional view taken on line III—III in FIG. 2, FIG. 4, on a larger scale, a vertical sectional view of a switching vessel containing a pair of cooperating power contacts of a gas blast circuit-breaker which is used in said switching panel, FIG. 5 on a larger scale, a vertical sectional view of the switching vessel containing a pair of cooperating switching contacts of an isolator forming part of the gas blast circuit-breaker of said switching panel, FIG. 6, on a larger scale, a vertical sectional view of a housing containing means for the operation of the switches pertaining to said switching panel and FIG. 7 partly a vertical sectional view, partly an elevational view of the upper part of one phase of said switching panel, in which the conduits connected to the housing containing the operating means shown in FIG. 6 are illustrated.

In FIG. 1 busbars of a double busbar system are designated by 1 and 2. Connected to these busbars by busbar-isolators 3 and 4 is a circuit-breaker 5 which consists of the series connection of four pairs of cooperating power contacts 6 constructed to interrupt the circuit only and of an isolator 7 constructed to keep the circuit interrupted and to close same. This isolator 7 is directly connected to the cable 8 connected to the switching panel. It is observed that a cable-isolator may be inserted between the isolator and the cable 8, should it be necessary that all switches 6, 7 of the circuit-breaker can be made free of tension on the spot.

In FIGS. 2 and 3 a metal vessel which is intended to be connected with earth is designated by 9 and is filled with an electronegative gas, e.g. sulphurhexafluoride ($SF_6$ gas) under low over-pressure, say a pressure of 3.5 atm. This vessel is attached by vertical metal tubes 10, 11 to metal tubes 12, 13 surrounding the busbars 1, 2. The busbar-isolators 3, 4 are mounted in the tubes 10, 11. The switching spaces of these isolators can be each divided into two chambers separated in the respective gas tight manner by means of a slide valves 14 and 15 adapted to be operated from the outside.

Mounted centrally in the vessel 9 is a vessel 16 which is filled with $SF_6$ gas under high over-pressure, say a pressure of 20 atm. This vessel extends with its upper part through the upper wall of the vessel 9 in a gas tight manner. A bellows 17 provides the gas tight passage of the high-pressure-vessel 16 through the upper wall of the low-pressure-vessel 9. The high-pressure-vessel 16 supports by means of insulators 18, 19 the switching vessels 20, 21 which contain pairs of cooperating power contacts and the cooperating switching contacts of the isolator forming also part of the gas blast circuit-breaker. The gas under high-pressure contained in the high-pressure-vessel 16 serves both to drive the switches mounted within the low-pressure-vessel 9 and to extinguish the switching arcs. Attached to the bottom of the low-pressure-vessel 9 is a cable junction box 22, in which the terminals for the connection of the cable 23 are mounted. Mounted upon the upper wall of the high-pressure-vessel 16 is a housing 24 containing operating means for the switches. This housing is surrounded by a hood 25 which is detachably fastened to the upper wall of the low-pressure-vessel 9. This hood encloses the space surrounding the housing 24 in a gas-tight manner, so that loss of gas due to leaking passages and packings of the housing are avoided. Before the hood 25 is removed the gas contained therein must be sucked out.

For the sake of clearness the conduits extending between the housing 24 and the switches 20, 21, 3 and 4 are omitted in FIGS. 2 and 3.

From FIG. 4 it appears that each switching vessel 20 consists of contact blocks 28, 29 kept at a distance from each other by insulators 26, 27. These contact blocks are supported by the insulators 18, which are attached to the high-pressure-vessel 16.

Each switching vessel 20 contains a power contact 30 having a stroke of relatively short length and a power contact 31 having a stroke of relatively long length. The contact 30 is coupled with a piston 32 which is mounted for reciprocation in a cylinder 33 and loaded by a spring 34. The contact 31 is coupled with a piston 36 which is mounted for reciprocation in a cylinder 35 and loaded by a spring 37. The switching chamber 38 inside the insulator 27 communicates through the lower insulator 18 with the high-pressure-vessel 16. In the condition of rest of the circuit-breaker the power contacts 30, 31 are electrically conductively interconnected and a valve consisting of an annular seat 39 carried by the cylinder 33 and a valve body 40 secured to the contact 31 is closed. In its closed condition the valve 39, 40 separates the switching chamber 38 from discharge passages 41, 42 for the extinguishing gas which are formed by bores extending through the power contacts 30 and 31. These passages lead the extinguishing gas through deionizators 43, 44 into the low-pressure-vessel 9.

The cylinder space 33a below the piston 32 is connected to a passage 45 provided with a change-over valve 46 which, in the condition of rest of the circuit-breaker, keeps said cylinder space 33a through passages 47 in open communication with the low-pressure-space of vessel 9. This change-over valve is held in the position shown by a spring 48 and for its operation it is coupled with a piston 50 mounted for reciprocation in a cylinder 49.

If the circuit-breaker must be opened gas under high over-pressure, for instance gas from the high-pressure-vessel 16, is supplied through a conduit 51 into the cylinder space 49a, so that the valve 46 is thrown over. This has the effect that gas under high over-pressure from the vessel 16 flows through ports 52 into the cylinder space 33a and the two switching contacts 30 and 31 are moved upwards by the piston 32. Due thereto the valve 39, 40 is opened and the piston 36 which is permanently exposed to the pressure in the switching chamber 38 but is balanced, when the valve 39, 40, of which the diameter is larger than that of the piston 36, is closed, is driven upwards by the gas in the switching chamber 38, so that, after the switching contact 30 having the stroke of shorter length has reached the ends of its stroke, the switching contact 31 is moved further along in upward direction and the switching contacts 30 and 31 are separated. The switching arc produced by this separation is extinguished by the extinguishing gas escaping from the switching chamber 38 through the then opened passages 41, 42.

After the valve 39, 40 has been opened gas also flows from the switching chamber through a narrow passage 53, the rather voluminous space 54 contained between the insulators 26, 27 and a narrow passage 55 to the cylinder space 35b above the piston 36 with a predetermined delay. As soon as the pressure in this cylinder space has become equal to that in the switching chamber 38 and the cylinder space 33a the power contacts 30 and 31 are returned to their closed condition of rest by the springs 34 and 37. However, before this happens, the switching arcs must be extinguished and the isolator connected in series with these power contacts must be brought into the switched-off position. In order to enable a quick movement of the contacts 30 and 31 towards the switched-off position the cylinder space 35b is connected with the space 54 by means of a wide passage 56 provided with a check-valve 57 closing towards said cylinder space 35b.

The isolator connected in series with the power contacts 30, 31 and constructed to keep the circuit interrupted and to close same is shown in FIG. 5. This isolator consists of a fixed contact 59 supported by a contact holder 58 and an axially movable switching rod 61 supported by a contact holder 60. This switching rod is coupled with a piston 63 mounted for reciprocation in a cylinder 62. The cylinder space 62a below the piston 63 is connected, in each condition of rest of the isolator 59, 61, through a passage 64 provided with a change-over valve 65 and passages 66 with the low-pressure-space of vessel 9. Also the cylinder space 62b above the piston 63 is in each condition of rest of the isolator in open communication with said low-pressure-space through a passage 67 provided with a change-over valve 68 and ports 69. The change-over valves 65 and 68 are held in the shown positions of rest by springs 70, 71 and they are coupled with pistons 74, 75 mounted for reciprocation in cylinders 72, 73.

The switching chamber 76 is in open communication with the high-pressure-space of vessel 16 through the lower insulator 19. The isolator is attached by insulators 19 to the vessel 16 and it is supported by said vessel only.

Should the circuit be closed the isolator 59, 61 is, in the present case, switched in. To this end gas under high over-pressure, say gas from the vessel 16, is supplied through the conduit 77 to the cylinder space 73a below the piston 75, so that the change-over valve 68 is put in the highest position and gas under high over-pressure is brought from the switching chamber into the cylinder space 62b above the piston 63 through the ports 78 and the passage 67. As then the cylinder space 62a below the piston 63 is connected with the low-pressure-space of vessel 9 through the passage 64, the change-over valve 65 and the ports 66 the switching rod 61 is moved downwards with great velocity and the switch is switched-in.

For the opening operation of the isolator 59, 61, which has to be effected a short time after the separation of the power contacts of the circuit-breaker and the extinction of the switching arcs, gas under high over-pressure is supplied through the conduit 79 to the cylinder space 72a below the piston 74. Due thereto the change-over valve 65 is moved upwards, so that gas under high over-pressure from the switching chamber 76 is brought through the ports 80 and the passage 64 into the cylinder space 62a below the piston 63. Since, immediately after the opening of the isolator 59, 61, the supply of gas under high over-pressure through conduit 77 is stopped and the cylinder space 73a below the piston 75 is again connected through the conduit 77 with the low-pressure-space, the change-over valve 68 will be found again in its lowest position, so that low-pressure will again reign in the cylinder space 62b and the switching rod 61 is driven back by the high-pressure in the cylinder space 62a with great velocity towards its switched-off position.

The operation of the valves, which are provided on the switching vessels of the switches shown in FIG. 4 and 5 and forming part of the circuit-breaker is, in the illustrative embodiment, effected pneumatically by means of operating means contained in the housing 24 mounted on top of the high-pressure-vessel 16. This housing containing operating means is illustrated in FIG. 6.

The housing 24 has a high-pressure-chamber 80 which communicates through a wide opening 81 with the high-pressure-vessel 16. The opening 81 can be closed by a slide valve 82 which can be operated from the outside. The housing contains also two change-over valves 83, 84 which serve to switch in and to switch off the switches of the circuit-breaker. Formed in the housing 24 is an annular chamber 85, to which the conduits 51 for the pneumatical operation of the valves 46 for controlling the power contacts of the gas blast circuit-breaker (FIG. 4) are connected. In addition, the housing 24 has an annular chamber 86 which communicates with the low-pressure-space of vessel 9 through conduits 88 (FIG. 7) connecting to ports 87. A third annular chamber 89 is formed in the housing 24, to which the conduit 77 for switching-in the isolator (FIG. 5) pertaining to the circuit-breaker is connected.

In the condition of rest of the circuit-breaker the annular chamber 85 is connected with the low-pressure-space of vessel 9 through the valve 83, the annular chamber 86, the ports 87 and the conduits 88 (FIG. 7). If the switches of the circuit-breaker have to be opened, the valve 83 is moved from the position shown in FIG. 6 into the highest position. In the latter position of the valve 83 gas under high over-pressure is enabled to flow from the high-pressure-chamber 80 into the cylinder spaces 49a of the change-over valves or valves (FIG. 4) through the annular chamber 85 and the conduits 51, so that said change-over valve or valves are operated and the power contacts 30, 31 are driven towards their switched-off positions. One of the conduits 51 is connected through a conduit having a delaying action and consisting of a narrow passage 90, a wide chamber 91 and a second narrow passage 92 with the conduits 79 leading towards the cylinder space 72a below the piston 74 for the operation of the switching-off valve 65 of the isolator shown in FIG. 5. By means of these conduits 90, 91, 92, 79 this isolator 59, 61 is opened some time after the separation of the power contacts 30, 31 of the circuit-breaker. Since during the time elapsed between the separation of the power contacts 30, 31 and the opening of the isolator 59, 61 the switching arcs produced between the contacts 30, 31 are extinguished, the isolator 59, 61 is switched off under no-load conditions.

The change-over valve 33 is, for its operation, coupled with a differential piston 93. The smaller area of this differential piston is permanently exposed to the pressure in the high-pressure-chamber 80. The cylinder space 94 having the greater diameter and contained in the differential cylinder, in which the piston 93 is provided, is connected through a narrow conduit 95 provided with a choke opening adapted to be adjusted by an adjusting screw 96 to the discharge end of the conduit 90, 91, 92 having the delaying action. By means of the adjusting screw 96 the delay, with which the cylinder space is filled with gas under high over-pressure, can be so adjusted as to guarantee that the piston 93 is forced downwards by the high-pressure exerted on its larger area, after the isolator 59, 61 of the circuit-breaker has reached its switched-off position. After the piston 93 and the change-over valve 83 have reached their lowest positions all conduits 51 and the conduit 79 are again in open communication with the low-pressure-space of vessel 9 through the chamber 85, the valve 83, the chamber 86, the ports 87 and the conduits 88.

The switching-in operation of the isolator 59, 61, is effected by the change-over valve 84 which is coupled with the differential piston 97 mounted for reciprocation in a differential cylinder. The smaller area of this differential piston is permanently exposed to the high pressure in the high-pressure-chamber 80 and the larger area thereof is exposed to the pressure in the cylinder space 98 having the greater diameter. The cylinder space 98 is connected to the switching-in conduit 77 through a conduit 99, 100, 101 having a delaying action. The switching-in of the isolator 59, 61 is effected when the differential piston 97 and the change-over valve 84 coupled therewith are moved upwards. In the highest position of the valve 84 the conduit 77 is connected with the high-pressure-chamber 80 through the chamber 89 and the valve 84. Through the conduit 99, 100, 101 the cylinder space 98 is filled with gas under high pressure some time after the conduit 77 has been filled with gas under high over-pressure and the isolator 59, 61 has been switched in, so that the piston 97 and the valve 84 return automatically into their lowest positions, wherein the conduit 77 and the cylinder space 98 are again connected to the low-pressure-space of vessel 9 through the chamber 89, the chamber 86, the ports 87 and the conduits 88.

In order to prevent continuous up and down movements or oscillations of the pistons 93 and 97, they are held in their lowest positions by means of locking members 102, 103. If these locking members are drawn away the differential pistons 93 and 97 move upwards and somewhat later they return to their lowest positions in the described manner. The locking members 102 and 103 are linked to T-shaped levers 106 and 107 which are mounted for rocking about axes 104 and 105 and support armatures 108, 109 of electromagnets 110, 111. Each electromagnet is provided with a permanent magnet 112, 113 which holds the armature 108, 109 in the attracted position, when the electromagnets 110, 111 is currentless. In these positions the locking members 102, 103 are in their locking positions.

If an electromagnet 110, 111 is energized a magnetic field is set up which counteracts the magnetic field of the permanent magnet 112, 113 in question, so that the armature 108 or 109 is released. If an armature 108, 109 is released in this way, the differential piston 93, 97 pushes through the rod 114, 115 and the locking member 102, 103, the lever 106, 107 upwards, so that said locking member is swung away and the differential piston 93, 97 and the change-over valve 83, 84 coupled therewith are moved upwards by the pressure in the chamber 80. Consequently, the circuit-breaker is switched in or switched off by means of an electrical command from the outside.

Each locking member 102, 103 can also be unlocked by means of a pin 118, 119 loaded by a spring 116, 117. To this end said pin 118, 119 is coupled with one arm of a crank-lever 122, 123 adapted to be swung about an axis 120, 121. These crank-levers may also be swung over shafts 120, 121 by hand, but they may also be operated pneumatically. To the latter end the other arms of the crank-levers 122, 123 rest upon a pin 124 which is coupled with a piston 126 mounted for reciprocation in a cylinder 125. Normally said piston 126 is held in its lowest position by a spring 127. However, if the circuit-breaker must be switched off or switched in, gas under pressure can be brought into the space of cylinder 125 below the piston 126 through a port 128.

In order to prevent that the locking members 102 and 103 are simultaneously unlocked the pins 118, 119 are provided in a block 130 constructed to be swung by the rods 114, 115 about an axis 129. In one position of the block the pin 118 is swung in front of the locking member 102 and in the other position of the block the pin 119 is swung in front of the locking member 103. The end positions of the block 130 are locked by a tumbler spring 131. This tumbler spring is provided on a rod 133 mounted for sliding in a tumbler bow and adapted to be used at the same time as a position indicator.

FIG. 2 shows that also the busbar isolators 3, 4 mounted in the tubes 10, 11 are driven pneumatically. To that end the switching rod of said isolators are coupled with pistons 135 mounted for reciprocation in cylinders 134. For controlling said busbar isolators two valve housings 136, 137 provided with double change-over valves 138, 139 (see FIG. 6) are mounted on the housing 24 containing the operating means for the gas blast circuit-breaker. These change-over valves 138, 139 are coupled for their operation with a piston 141 mounted for reciprocation in a cylinder 140. By means of the valve 138 the conduit 142 extending between the valve housing 136 and the lower space of the cylinder 134 for the switching-off operation of the busbar isolator 3 can be connected either with the high-pressure-chamber 80 or through ports 143 with the atmosphere or the low-pressure-space of vessel 9. The valve 139 connects the conduit 144 extending between the valve housing 136 and the upper space of the cylinder 134 for the switching-in operation of the busbar isolator 3 either through the ports 145 with the atmosphere or the low-pressure-space of vessel 9 or with the high-pressure-chamber 80. In the same way the valve housing 137 is connected through conduits 146, 147 with the cylinder spaces of the cylinder 148 for driving the busbar isolator 4. Through conduits 149, 150 the piston 141 for driving the change-over valves 138, 139 can be operated from the outside. The operating conduits for the change-over valves of the valve house 137 are designated by 151, 152. In the present case the ports 143, 145 of the valve house 136, (137) are connected through conduits 88 with the low-pressure-space of vessel 9 (see FIG. 7)

The conduits extending between the housing 24 containing the operating means and the switches of the switching panel illustrated in FIGS. 2 and 3 are shown in FIG. 7. The port 128 shown in FIG. 6 and formed in the cylinder 125 below the piston 126 is connected to the conduit 153 for the pneumatical unlocking of the locking member 102 or 103.

The position indicator 133 is exposed to view through a window 154 of the hood 25.

Although in the described embodiment the change-over valves 83, 84 contained in the housing 24 are constructed for the pneumatical operation of the change-over valves or valves 46 for controlling the power contacts 30, 31 and for the operation of the change-over valves or valves 65, 68 for controlling the switching rod 61 of the isolator 59, 61 pertaining to the circuit-breaker, said change-over valves 83, 84 may also be used directly for controlling all switching contacts of the circuit-breaker. In that case the valves 46, 65 and 68 are omitted.

Another possibility is that the valves 46, 65 and 68 are operated mechanically by the operating means contained in the housing 24. To that end the rods 114, 115 coupled with the differential pistons 93, 97 are coupled with operating rods 157, 158 through T-levers 156 mounted for rocking about axes 155 (FIG. 6).

What I claim is:

1. A metal clad electric distribution and switching plant for high voltages including a plurality of multiphase switching panels and at least one multiphase busbar system for the electric circuit interconnection of said switching panels, each phase of at least one of said switching panels comprising a metal low-pressure-vessel filled with insulating gas under low pressure, a high-pressure-vessel filled with arc-extinguishing gas under high pressure and located within said low-pressure-vessel, a gas blast circuit-breaker at least constructed to interrupt said circuit, a series connection of a plurality of pairs of cooperating power contacts forming part of said circuit-breaker, a plurality of switching vessels, each pair of power contacts being accommodated in an individual one of said switching vessels and conduits of the shortest possible length extending between said high-pressure vessel and said switching vessels being insulatedly accommodated in said low-pressure-vessel outside said high-pressure-vessel.

2. A metal clad electric distribution and switching plant as claimed in claim 1, comprising an isolator constructed to keep the circuit interrupted and to close same and an additional switching vessel, said additional vessel containing said isolator and being also located in said low-pressure-vessel outside said high-pressure-vessel, said isolator being connected in series with said series connection of pairs of cooperating power contacts of the circuit-breaker and said power contacts being constructed to interrupt the circuit only and constituting together with said isolator the said gas blast circuit-breaker.

3. A metal clad electric distribution and switching plant as claimed in claim 1, in which all switching vessels of the gas blast circuit-breaker are mounted in a circular series round the high-pressure-vessel.

4. A metal clad electric distribution and switching plant as claimed in claim 1, in which all switching vessels of the gas blast circuit-breaker are supported by said high-pressure-vessel.

5. A metal clad electric distribution and switching plant as claimed in claim 1, comprising in addition a plurality of cylinders, a plurality of pistons mounted for reciprocation in said cylinders and adapted to be driven by extinguishing gas from the high-pressure-vessel, each piston being coupled with a movable switching contact of the gas blast circuit-breaker, conduits extending between the high-pressure-vessel and spaces of said cylinders, valves being provided in said conduits and constructed to be operated from the outside and to control said pistons, a housing and means contained in said housing for the operation of said valves, the high-pressure-vessel extending in a gas-tight manner through an end wall of the low-pressure-vessel and said housing being mounted on the end wall of the high-pressure-vessel outside the low-pressure-vessel.

6. A metal clad electric distribution and switching plant as claimed in claim 5, comprising also a removable envelope, said envelope enclosing a space located above the two pressure vessels and closed in a gas-tight manner, said housing containing said valve operating means being accommodated within said envelope.

7. A metal clad electric distribution and switching plant as claimed in claim 5, comprising in addition a high-pressure-chamber contained in said housing and communicating with the high-pressure-vessel, said conduits provided with said valves for controlling said pistons coupled with the movable switching contacts of the gas blast circuit-breaker being connected to said housing and said valve being accommodated in said housing and constructed as change-over valves, which in their one positions connect said conduits with said high-pressure-chamber and in their other positions connect said conduits with the atmosphere or with the low-pressure-vessel.

8. A metal clad electric distribution and switching plant as claimed in claim 5, comprising in addition a high-pressure-chamber contained in said housing and communicating with the high-pressure-vessel, the conduits provided with the valves for controlling the pistons coupled with the movable switching contacts of the gas blast circuit-breaker being directly connected to the high-pressure-vessel, said valves being provided on the switching vessels of the gas blast circuit-breaker and constructed for pneumatical operation, conduits for the pneumatical operation of said valves, said latter conduits being connected to said housing, and change-over valves accommodated in said housing, said change-over valves being arranged for connecting said last mentioned conduits either to said high-pressure-chamber or to the atmosphere or the low-pressure-vessel.

9. A metal clad electric distribution and switching plant as claimed in claim 5, comprising in addition operating means accommodated in said housing, the conduits provided with the valves for controlling the pistons coupled with the movable switching contacts of the gas blast circuit-breaker being directly connected to the high-pressure-vessel and said valves being provided on the switching vessels of the gas blast circuit-breaker and mechanically coupled for their operation with said operating means accommodated in said housing.

10. A metal clad electric distribution and switching plant according to claim 5, comprising in addition a high-pressure-chamber contained in said housing and communicating with the high-pressure-vessel, differential cylinders provided in said housing, differential pistons mounted for reciprocation in said differential cylinders, means for the operation of the valves for controlling the pistons coupled with the movable switching contacts of the gas blast circuit-breaker being provided in said housing and coupled with said differential pistons, the smaller piston area of each one of said differential pistons being permanently exposed to the pressure in said high-pressure-chamber and the larger piston area thereof being exposed to the pressure in the cylinder space of greater diameter of the differential cylinder in question, conduits having a delaying action, change-over valves contained in said conduits, said change-over valves being coupled with said differential pistons and adapted each to connect a cylinder space of greater diameter of such a differential cylinder through such a conduit either with said high-pressure-chamber or with the atmosphere or the low-pressure-vessel, and locking means adapted to be unlocked from the outside, said locking means holding, in each condition of rest of the circuit-breaker, said operating means in their positions, in which said spaces of greater diameter of said differential cylinders communicate through said conduits and said change-over valves with the atmosphere or the low-pressure-vessel.

11. A metal clad electric distribution and switching plant as claimed in claim 10, in which said change-over valves coupled with said differential pistons are at the same time the valves for controlling the pistons coupled with the movable switching contacts of the gas blast circuit-breaker.

12. A metal clad electric distribution and switching plant as claimed in claim 10, in which said change-over valves coupled with said differential pistons are at the same time change-over valves for the pneumatical operation of the valves for controlling the pistons coupled with the movable switching contacts of the gas blast circuit-breaker.

13. A metal clad electric distribution and switching plant as claimed in claim 10, in which electrically controllable magnets are provided to hold said locking means in their locking positions.

14. A metal clad electric distribution and switching plant as claimed in claim 10, comprising in addition at least one busbar isolator, an additional cylinder, a piston mounted for reciprocation in said additional cylinder and coupled with the movable contact of said busbar isolator, said busbar isolator being constructed to connect the gas blast circuit-breaker with other parts of the circuit and being in communication with the low-pressure-vessel outside the high-pressure-vessel, at least one additional valve housing mounted on the housing containing the operating means for controlling the gas blast circuit-breaker, additional change-over valves accommodated in said additional valve housing and conduits extending between the spaces of said additional cylinder and said additional valve housing, said additional change-over valves being adapted to connect said additional cylinder spaces either with the high-pressure-chamber of said housing containing said operating means or with the atmosphere or the low-pressure-vessel.

15. A metal clad electric distribution and switching plant according to claim 5, in which a valve constructed to be operated from the outside is provided between the high-pressure-vessel and the high-pressure-chamber of the housing containing the operating means for controlling the gas blast circuit-breaker.

* * * * *